(12) United States Patent
Pollard et al.

(10) Patent No.: US 8,842,916 B2
(45) Date of Patent: Sep. 23, 2014

(54) METHOD AND SYSTEM FOR MODEL-BASED SIGNATURE PROFILE EXTRACTION

(75) Inventors: Stephen Pollard, Dursley (GB); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 592 days.

(21) Appl. No.: 13/032,479

(22) Filed: Feb. 22, 2011

(65) Prior Publication Data

US 2012/0212324 A1 Aug. 23, 2012

(51) Int. Cl.
- *G06K 9/46* (2006.01)
- *G06K 9/00* (2006.01)
- *G06K 9/48* (2006.01)

(52) U.S. Cl.
CPC ........ *G06K 9/00161* (2013.01); *G06K 9/00577* (2013.01); *G06K 9/48* (2013.01)
USPC ....................................... 382/190

(58) Field of Classification Search
None
See application file for complete search history.

(56) References Cited

U.S. PATENT DOCUMENTS

| | | | |
|---|---|---|---|
| 7,020,320 B2 | 3/2006 | Filatov | |
| 7,228,428 B2 | 6/2007 | Cousins et al. | |
| 2002/0064308 A1* | 5/2002 | Altman et al. | 382/187 |
| 2005/0175222 A1* | 8/2005 | Silverbrook et al. | 382/119 |
| 2010/0053171 A1 | 3/2010 | Cheng | |
| 2012/0166341 A1* | 6/2012 | Faith et al. | 705/44 |

FOREIGN PATENT DOCUMENTS

WO  WO 2010/134919  11/2010

OTHER PUBLICATIONS

Siyuan Chen; Sargur Srihari, "Use of exterior contours and shape features in off-line signature verification," Document Analysis and Recognition, 2005. Proceedings. Eighth International Conference on , vol., No., pp. 1280, 1284 vol. 2, Aug. 29-Sep. 1, 2005.*

Adams, G., "Hand held Dyson Relay Lens for anti-counterfeiting," Imaging Systems and Techniques (IST), 2010 IEEE International Conference on , vol., No., pp. 273,278, Jul. 1-2, 2010.*

Simske, S.J., et al., "High-Resolution Glyph-Inspection Based Security System", IEEE ICASSP, Mar. 14, 2010.

Zhu, B., et al., "Print Signature for Document Authentication," ACM CCS '03, pp. 145-154, Oct. 27-31, 2003.

Pollard, S.B., et al., "Resolving Distortion Between Linear and Area Sensors for Forensic Print Inspection," IEEE ICIP, Sep. 25, 2010.

Simske, S.J., et al., "An Imaging System for Simultaneous Inspection, Authentication and Forensics," IEEE IST, Jul. 1, 2010.

Pollard, S.B., et al., "Model Based Print Signature Profile Extraction for Forensic Analysis of Individual Text Glyphs," IEEE WIFS, Dec. 13, 2010.

H. Daher et at, A New Approach for Centerline Extraction in Handwritten Strokes: An Application to the Consitution of a Code Book, 2010.

Liang Wan et al, "Signature Sample Synthesis".

* cited by examiner

*Primary Examiner* — Nirav G Patel

(57) ABSTRACT

A method for model-based signature profile extraction includes capturing an image of an authentic glyph. An outline model is fit to the image of the authentic glyph, and an authentic signature profile is extracted based on the outline model. A signature profile extracted from an image of another glyph may be compared to the to the authentic signature profile so as to forensically verify authenticity of the other glyph The system for model-based signature profile extraction includes a controller, a capture unit, an outline unit, a profiling unit, and a forensic verification unit. A computer readable medium containing executable instructions is also described.

20 Claims, 8 Drawing Sheets

Fig. 3

METHOD AND SYSTEM FOR MODEL-BASED SIGNATURE PROFILE EXTRACTION

BACKGROUND

Counterfeiting, warranty fraud, product tampering, smuggling, product diversion and other forms of organized deception are driving the need for improved brand protection. Securitized printing and imaging may provide forensic level authentication to form part of a general approach to product and document security.

One level of forensic analysis of printed material including documents, packaging and labels is device forensics/ballistics, where a document (or set of documents) is analyzed to see if it was printed on a specific device or class of devices. A second level of forensic analysis is print forensics, where individual printed artifacts are uniquely identified. This allows the differentiation of individual instances of the same or highly similar documents—including high quality copies.

Individual text glyphs may be inspected using a true resolution device to create a registry for forensic identification. In some implementations a Dyson Relay CMOS Inspection Device (DrCID) may be used to make any individual printable glyph (e.g. character or symbol) a forensic mark. A DrCID device may include, for example, lens-based CMOS imaging hardware capable of high resolution (e.g., 1:1 magnification and 3.5 micron true resolution). Such device hardware may enable high-resolution scanning and may facilitate the capture of both intentional printing shapes and unintentional printing artifacts caused by the printing process and interaction of the ink with the substrate on which printing occurs.

Forensic authentication may be based on the analysis of the perimeter of threshold binary image components (e.g. over 360 degrees in one-degree bins) using a large number of profile measures, including radius. Each pair of profiles may be aligned to optimize a normalized similarity metric based on a sum of absolute differences between the pair of profiles: $S=1-(SAD)/((SA1+SA2)/2)$, where SAD is the sum of absolute differences; and SA1 and SA2 are the sum of absolute values of the first and second profile measure respectively.

BRIEF DESCRIPTION OF THE DRAWINGS

FIG. 3 shows an example of a captured image swath for application of MBSP extraction, in accordance with an embodiment of the invention;

DETAILED DESCRIPTION

Figure 1:
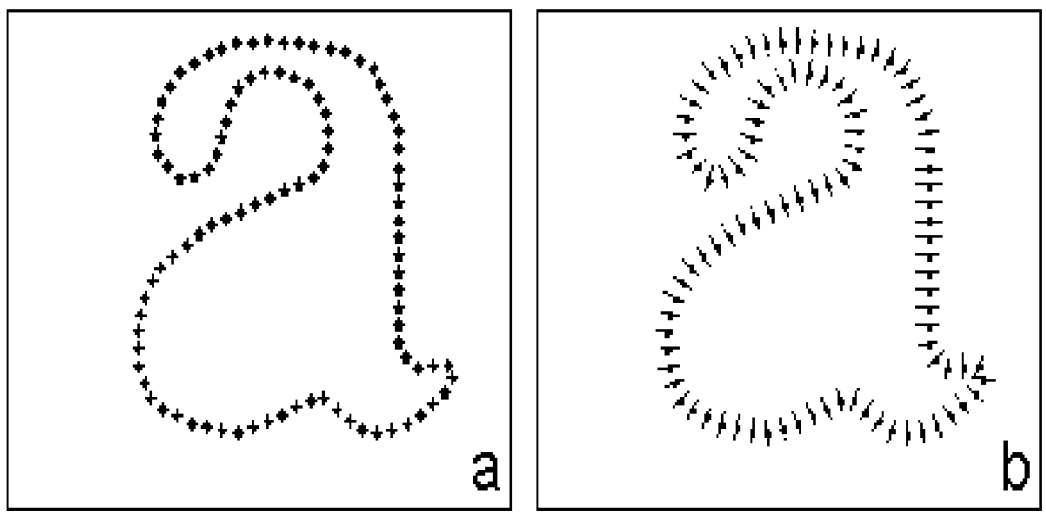
FIG. 1 illustrates a model of the outer contour of a Times lowercase 'a' in accordance with an embodiment of the invention.

In accordance with an embodiment of the invention, a glyph model may be used to extract a signature profile for forensic inspection. Each time an image of an individual glyph is captured an outline model of it may be fitted. The outline model may be used as a reference against which the signature profile of unintentional aspects of the printed character can be formed. This reference may help separate the truly unique and random part of the outline of a text glyph from its general shape-conveying component. Separating the unique from the general may improve greatly the statistical properties of the forensic verification process allowing individual characters to act as robust forensic marks that help protect printed material from cloning and copying.

In accordance with an embodiment of the invention, the outline model may be used to allow printed glyphs to be compared between different capture devices (e.g., inline scanners, contact microscopes, high resolution cameras, etc.) with a minimum of costly calibration and need for fine control. The model can be available a priori or extracted by one or other imaging modality.

In accordance with an embodiment of the invention, a model-based approach may extract a signature profile around the outer edge of a text glyph. This signature profile may encode that part of the glyph boundary that is due to the random fluctuation of the print process, enabling significantly higher levels of forensic discrimination than previously shown. This model-based approach may enable a security workflow where a line-scan device is integrated into production line inspection with later forensic investigation in the field being done using a DrCID device. In one implementation, a simple shape-descriptor model may encode the signature profile, making it easier to manipulate, test and store. This shape-descriptor may provide forensic level authentication of a single printed character.

In order to use a model for the extraction of signature profiles from any text glyph it is necessary to (1) have a source of suitable models, (2) have a robust and accurate way to locate models in captured images, and (3) define the extraction of the signature profile with respect to the model.

In accordance with an embodiment of the invention, a model may be an outline of the forensic mark under examination. Model types may include:

1. A generic shape model such as an ellipse, circle or square may be suitable for a restricted set of forensic marks. For example an ellipse can be used to model an 'o' or a square can be used to model the outline of a 3D (color) barcode. For each generic shape a specific algorithm may be used to fit the model to the outline of the forensic mark.

2. A generic glyph model, where a more complex shape-specific model may be matched to the outline of the forensic mark using a generic shape-matching algorithm that may find the best fit of the model according to an allowed transformation (e.g., similarity, affine, or perspective plane). Models may be built either directly from font descriptions or by combining one or more processed outlines recovered from DrCID images. For example, a model may be built from a font description using a (printer specific) font rendering model that simulates how the font will be rendered at a given resolution on a printer.

3. A specific glyph instance model where one image (presumably the one in the registry) may be selected as the "to be modeled" image. The outline of the text glyph may then be extracted and possibly processed to produce a model that is then stored in a registry. When inspecting a suspected image of the modeled instance, the instance model may be downloaded (alternatively the image may be uploaded) and transformed into the current image. It may be advantageous to simplify the model stored in the registry (essentially by smoothing it to remove all the creases and wrinkles of the outline description) so that signature profiles can be recovered from each image for subsequent comparison.

After a model is located in an image, the signature profile may be extracted by first sampling the region normal to the model contour to construct a profile image. The height of the profile image may be fixed in proportion to the dimension of the glyph as a whole (as determined by the mean distance of each point in the model from its center of gravity).

The signature profile may be recovered from the profile image by finding a representative boundary location within each column of the image. This can be done in a number of ways including thresholding and traditional edge detection. However these processes can result in chaotic behavior, where a small change in the imaging conditions (e.g., illumination, profile, or orientation) can lead to a large change in the profile.

In accordance with an embodiment of the invention, the profile may be conditioned by removing low frequency variations—for example, by subtracting off a low pass filtered version of the profile using a Gaussian function with a large standard deviation (e.g., 9.0). Then, a form of variable penalty Dynamic Time Warping (DTW) (see for example D. Clifford, G. Stone, I. Montoliu, S Rezzi, F. P. Martin, P. Guy, S. Bruce and S. Kochhar, "Alignment using variable penalty dynamic time warping", Anal. Chem. 81, pp 1000-1007, 2009) may be used to compare profiles. DTW may be used for measuring similarity between two time sequences that are subject to distortions in the time axis. That is, the timeline of one signature profile is warped to reduce the sum of absolute difference (SAD) error with respect to the other, but where the degree of warp incurs a proportionate matching cost. Such a proportionate matching cost may impose a penalty for a physically unrealistic exaggerated degree of warp even when resulting in better overall fit.

In accordance with an embodiment of the invention it may be advantageous to further process the signature profile to produce a simple shape warp code that describes its statistical properties using a small (relative to the number of elements in the signature profile itself) number of integer values. In this way it is possible to derive a description of the profile that is easy to manipulate, test and store while retaining much of usefulness for forensic discrimination.

Model Based Signature Profiles

In accordance with an embodiment of the invention, a model-based signature profile (MBSP) may be defined as a set of N uniformly spaced points (x, y coordinates) defining the outer edge of a character glyph and associated unit normal vectors (u, v). FIG. 1 illustrates a model of the outer contour of a Times lowercase 'a'. FIG. 1a illustrates a model composed of 100 feature points shown alone. FIG. 1b illustrates the model with associated normals. In accordance with an embodiment of the invention, to avoid sampling artifacts models may be an order of magnitude denser than shown in FIG. 1, with typically between 1000 and 2000 feature points. Non-convex shapes, such as the outline of the 'a' in FIG. 1, have a uniform description free from multiple crossings, critical points and discontinuities. The MBSP may recover a description having an order fixed with respect to the model, provided the model is free from internal axes of symmetry. This makes the profile comparison process more simple and robust and facilitates the extraction of generalized shape warp codes.

Figure 2:
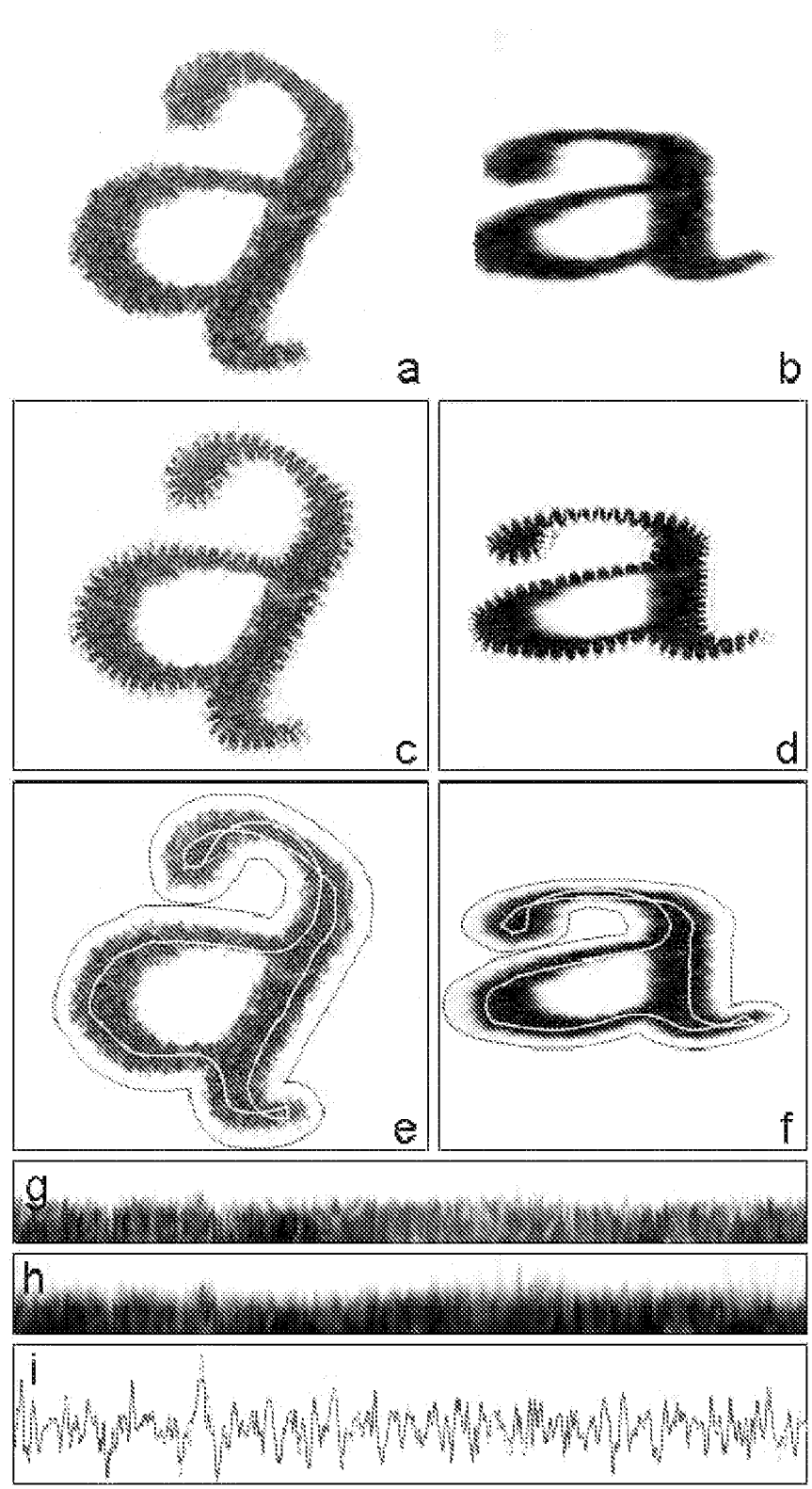
FIG. 2 illustrates images captured by two different modalities.

Using a model to extract a signature profile may allow forensic comparison between very different images. FIG. 2 illustrates images captured by a DrCID and a line-scanner FIG. 2a illustrates the extraction and matching of MBSPs for a Times 12 point 'a' 900×800 pixel (width×height) image captured by a DrCID. FIG. 2b is a 400×400 image of the same character captured as it is printed by a line-scan camera. FIG. 2c and FIG. 2d show the images of FIG. 2a and FIG. 2b, respectively, with superimposed transformed model data with approximate normal vectors. FIG. 2e and FIG. 2f show the loci of sampled regions for the extracted normal profile images in FIG. 2g and FIG. 2h, respectively. Each column of FIGS. 2g and 2h corresponds to sampling on a vector between the loci along the normal vector for each individual (x, y) contour point of the model. Finally FIG. 2i compares MBSP results extracted from FIGS. 2g and 2h after application of DTW.

Consider the signature profile extraction process shown in FIG. 2. For each of the DrCID and line-scan images the model described as:

$$M = \begin{bmatrix} x \\ y \\ u \\ v \end{bmatrix} = \begin{bmatrix} x_1 & \ldots & x_i & \ldots & x_N \\ y_1 & \ldots & y_i & \ldots & y_N \\ u_1 & \ldots & u_i & \ldots & u_N \\ v_1 & \ldots & v_i & \ldots & v_N \end{bmatrix}$$

is matched to the outline of the text glyph subject to a homogeneous transformation of the form $$H'_{xy} = \begin{bmatrix} x' \\ y' \\ {}_N 1 \end{bmatrix} = TH_{xy} = T \begin{bmatrix} M_{xy} \\ {}_N 1 \end{bmatrix} = \begin{bmatrix} t_{1,1} & t_{1,2} & t_{1,3} \\ t_{2,1} & t_{2,2} & t_{2,3} \\ 0 & 0 & 1 \end{bmatrix} \begin{bmatrix} x \\ y \\ {}_N 1 \end{bmatrix}$$

(where $_N1$ is a vector of N ones), which covers both the similarity (rotation and scale) when matching to the DrCID image as in FIG. 2c and affine (which also includes skew and asymmetric scale) when matching to the line-scan data in FIG. 2d.

In order to extract each signature profile a normal image is constructed. At each point of the model an interval along the normal direction is defined between two control points $N'_{xy}$ and $N''_{xy}$ that are described by:

$$N'_{xy} = M_{xy} - dM_{uv} = \begin{bmatrix} x \\ y \end{bmatrix} - d \begin{bmatrix} u \\ v \end{bmatrix} \text{ and } N''_{xy} = M_{xy} + dM_{uv} = \begin{bmatrix} x \\ y \end{bmatrix} + d \begin{bmatrix} u \\ v \end{bmatrix}$$

where d is a fixed distance corresponding percentage of the model size. (The fixed distance d can be defined by a mean absolute distance of each point of the model from a center of gravity of the model.) Once $N'_{xy}$ and $N''_{xy}$ are transformed into the various images using appropriate similarity (in FIG. 2) or affine (in FIG. 2f) transforms, the loci of the control points (shown as overlaid lines) may be determined. By uniformly sampling the underlying image between the control points (using standard bilinear interpolation to achieve sub-pixel accuracy) the required normal profile images in FIG. 2g and FIG. 2h may be constructed.

Many methods can be used to recover the signature profile from the profile image, including simple thresholding or maximum edge detection. In accordance with an embodiment of the invention, the following grayscale edge metric, which represents all of the data in the profile image, may be applied. For each column (indexed by i) in the profile image, the signature profile is defined as:

$$p_i = \sum_j j w_j e_{ij} / \sum_j w_j |e_{ij}|$$

where $e_{ij}$ is an edge strength corresponding to the digital derivative of the profile image along the column i, and $w_j$ is a windowing function (e.g., a Gaussian with standard deviation ¼ the column height centered on the mid point of the column). Dividing by a normalizing sum of windowed absolute edge strength may result in a measure that achieves robustness to both scene content and intensity variation.

It may be possible to resolve small but significant residual linear and non-linear errors that are due to inaccuracy in the model and the model fitting process, as well as non-linear variation in the image (particularly for the line-scan image, but also significant for DrCID). First the profile may be conditioned by removing low frequency variations (subtracting off a low pass filtered version of the profile—e.g., a Gaussian with a large standard deviation). Then, when comparing profiles rather than simply computing a SAD (sum absolute difference) error metric, a form of variable penalty Dynamic Time Warping (DTW) (see, for example, Clifford et al.) may be used. That is the timeline of one signature profile is warped to reduce the SAD error with respect to the other but where the degree of warp incurs a proportionate matching cost.

As shown in FIG. 2i, despite a difference in the spatial frequency content and the high degree of physical distortion (an almost 50% scaling in the vertical direction) between the DrCID and line-scan data, the recovered signature profiles are quite similar and are brought into close correspondence using the DTW approach.

Shape Warp Coding

A shape distortion encoding distance (SDED) may be based on shape warp coding (SWC). In accordance with an embodiment of the invention, the MBSP may be used as a basis SWC for the general case of any irregular text glyph (e.g., one for which the matching process may recover a unique model location). The signature profile may be divided into N equal length segments. For each length segment j, compute a sum squared error (SSE) of the residual (which is akin to a local variance):

$$SSE_j = \sum_{p_i \in segment(j)} (p_i - \mu_j)^2$$

where $p_i$ is a signature profile within segment j and $\mu_j$ is its mean value over the jth segment. The mean (or median) value of the SSE (or a factor or multiple of it) may be used as an atomic unit of encoding (a "digit"), to form an N-position string that represents the SWC:

$$SWC(j) = \|SSE_j / SSE_{mean}\|$$

where $\|.\|$ represents a rounding function. The SDED, for comparing the SWCs of any two forensic marks, may be defined as:

$$SDED = \sum_j \min(|SWC_1(j) - SWC_2(j)|, T_{max})$$

where $T_{max}$ is an optional threshold to improve robustness, the magnitude of $T_{max}$ and the decision whether to apply it being determined empirically.

The SDED can be considered a form of modified Hamming Distance where the expected value of SWC(*) is 1 at each digit due to the normalization process described. For example, a pair of SWCs (N=50) extracted from DrCID data for the same printed 'a' (SWC1 and SWC2), and their absolute difference (DIFF), are:

SWC1=11011112011011112112111211111011 2121121111010111
SWC2=11111111210100101211211121112110111 111121111011210
DIFF=00100000011001010000000000000100000 1010000000001101

In this case, the SDED is 11 (or 0.22 when normalized by N).

Examples of Application of MBSP

Figure 3:
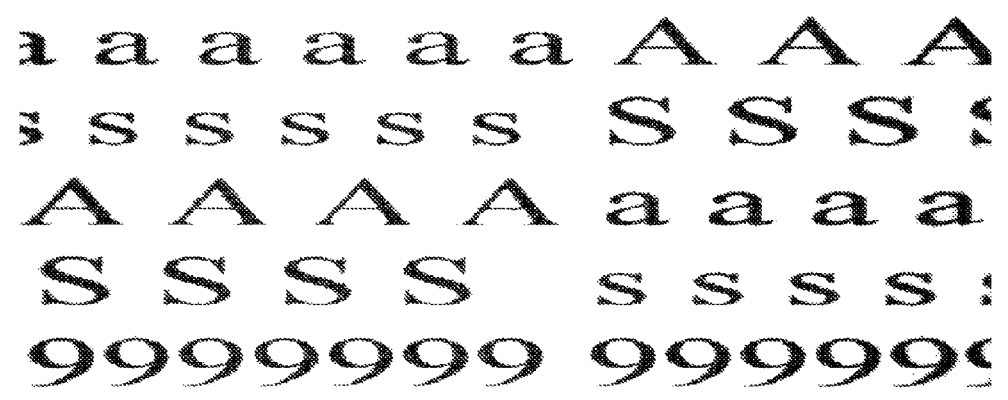

FIG. 3 shows an example of a captured image swath for application of MBSP extraction, in accordance with an embodiment of the invention. The example was printed with an HP Inkjet K5400 printer and was captured using a line scan camera. The nine lowercase letters 'a' and 's' in each such image were also captured twice using the DrCID device, once approximately vertical and for a second time at a considerable angle (about 30° from vertical). For comparison, the same data was also printed on a HP Photosmart 2610 all-in-one (Inkjet) printer (PS2610 for short) and captured twice with DrCID.

Figure 4:
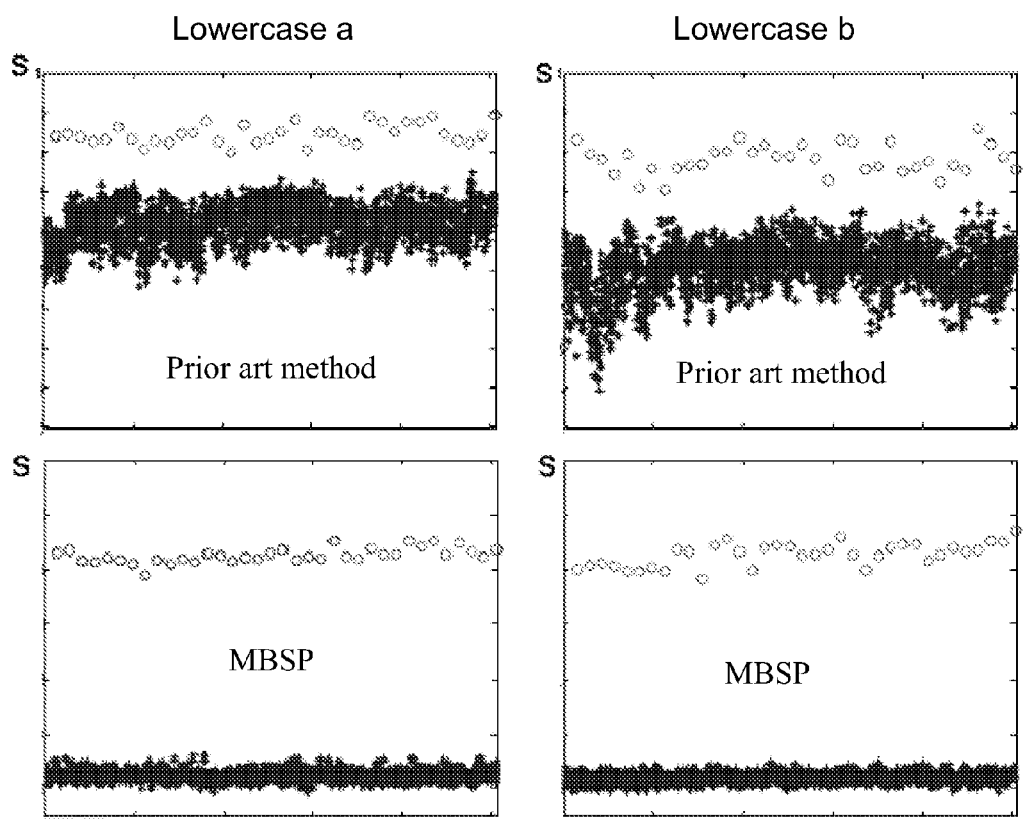
FIG. 4 illustrates a comparison between application of MBSP, in accordance with an embodiment of the invention, and application of a prior art method to data captured by DrCID.

FIG. 4 illustrates a comparison between application of MBSP, in accordance with an embodiment of the invention, and application of a prior art method to data captured by DrCID. Specifically, four sets of DrCID data were compared, with and without rotation, totaling seventy-two individual images each of lowercase 'a' and of lower case 's'. Each image is compared to the seventy-one other images of the same letter (of which thirty-six comparisons are valid and 2,520 are not). FIG. 4 illustrates a plot of a similarity metric S for each comparison of each character using each method (the prior art method used was max-radius). Similarity data S for the letter 'a" is presented at the top left for a prior art method, and MBSP at the bottom left. The similarity metric for the letter 's' is on the top (prior art) and bottom (MBSP) right of FIG. 4. Valid matches are indicated by circles and false matches by stars. Note that as the range of similarity is relatively small for the prior art (0.955 to 1) as it also encodes the shape of the text glyph rather than just the perturbations. On the other hand, the range of similarity for the MBSP is much larger (−0.2 to 0.8). Thus, as shown in FIG. 4, MBSP results in a very clear gap between distributions for valid matches and those for incorrect matches.

Figure 5:
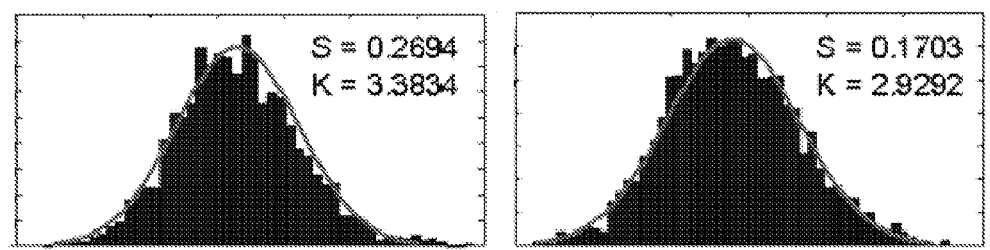
FIG. 5 illustrates a histogram for the false match data illustrated in FIG. 4.

FIG. 5 illustrates a histogram for the false match MBSP data illustrated in FIG. 4. FIG. 5 presents distributions of similarity scores for the 2,520 false matches resulting from application of the MBSP method, in accordance with an embodiment of the invention. The histogram on the left of FIG. 5 illustrates results for lowercase 'a', and the histogram on the right illustrates results for lowercase 's'. Skewness and kurtosis are close to Gaussian (0, 3) but, given the large sample size, they do show statistically significant deviations. Since the distributions are reasonably close to (but not exactly) Gaussian, and assuming that the same is approximately true for valid matches (where the sample is much smaller), a Z-score approximation may be applied (it is an approximation as these are sample, rather than population, statistics) to measure the separation of the two populations:

$$Z=|\bar{S}_V-\bar{S}_F|/(\sigma_V+\sigma_F)$$

that is, the absolute difference of the mean similarity scores for veridical and false matches divided by the sum of their standard deviations.

For the MBSP data of FIG. 4, this calculation results in Z-scores of 18.1 and 13.7 respectively for the 'a' and 's' data corresponding to infinitely small probabilities of false authentication (compared to Z-scores of 3.2 and 2.8 by the prior art method—the prior art method may yield improved results when the forensic mark is not rotated).

Figure 6:
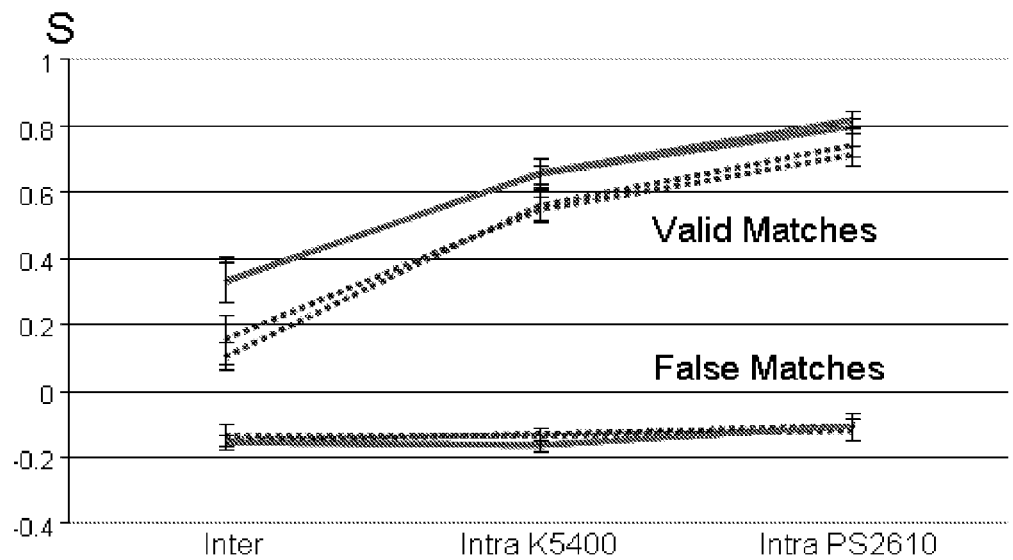
FIG. 6 illustrates comparison of similarity data for application of MBSP based on different models, in accordance with an embodiment of the invention.

Results using two different sources of model data may be compared. Results from applying a set of model data based on the Truetype font may be compared with results from applying model built by combining DrCID images of the instances referred to in connection with the previous example (including the instances shown in FIG. 3). FIG. 6 illustrates comparison of similarity data for application of MBSP based on different models, in accordance with an embodiment of the invention. In FIG. 6, statistics for veridical and false matches for intra-device (DrCID to DrCID with rotation) and inter-device (DrCID to line-scan camera) are compared. Standard deviations are shown as error bars for the TrueType font model (dotted) and the built model (solid), for data for lowercase 'a' and 's' (the results for the two lower case letters being nearly identical, resulting of pairs of nearly overlapping curves). Under all three conditions (Inter: inter-device between DrCID and a line-scan camera; Intra K5400: DrCID on data printed using a HP Inkjet K5400 office print; Intra PS2610: DrCID on data printed using an HP Photosmart 2610 all-in-one (Inkjet) printer) the mean similarity score in the case of valid matches is larger (improved result) with the built model than with the font model. (The increased score for Intra PS2610 over Intra K5400 may be due to differences in print perturbations between the two printers.)

The better performance of the built model over the font model may be due to the vagaries in the printing process that result in numerous changes to the font outline in the print driver, firmware and hardware. (In all cases, the built model was based on DrCID data from K5400 prints.)

Figure 7:
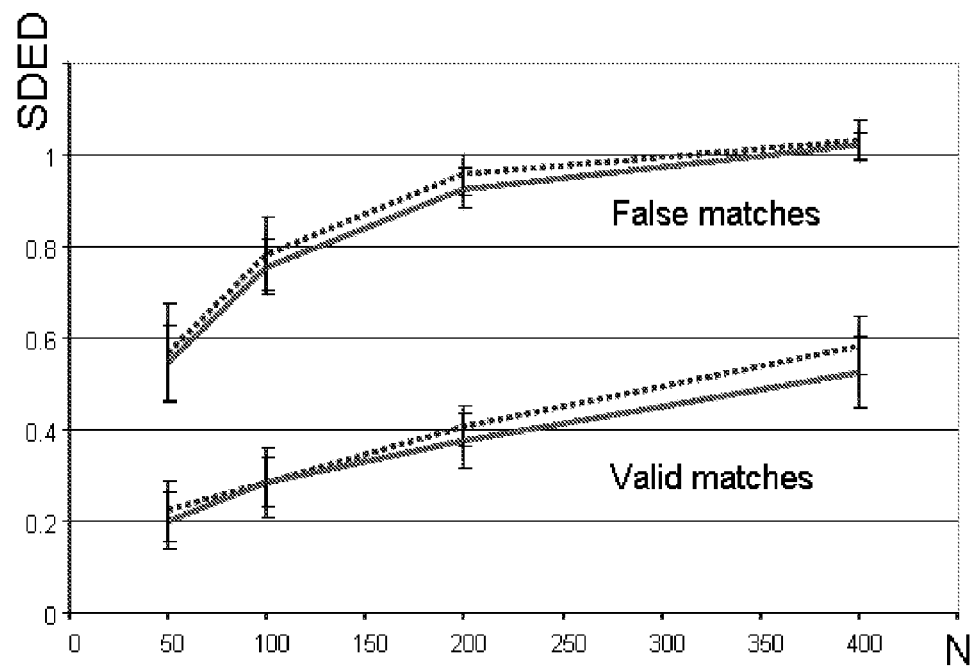
FIG. 7 illustrates the effect of the number of sampling segments (N) on SDED based on MBSP, in accordance with an embodiment of the invention.

In computing SDED, the number of sampling segments N used in the SWC calculation may be varied. FIG. 7 illustrates the effect of the number of sampling segments (N) on SDED based on MBSP, in accordance with an embodiment of the invention. FIG. 7 shows results for the default atomic unit set to mean SSE (which was found to be optimal) for a range of SWC sampling segments N between 50 and 400 samples. With standard deviations shown as error bars, results are shown for lowercase 'a' (dots) and lowercase 's' (lines) for a range of sampling segment numbers N. The best forensic security occurs at about 200 samples where the probability of false validation is less than $10^{-9}$. As SDED is a difference score, false matches yield higher SDED values than valid ones.

In accordance with an embodiment of the invention, a method may use a model to extract a print signature from the outer boundary of a text glyph. The method may provide a high level of forensic security. The method may achieve sufficient discrimination even for the difficult case where a forensic mark is scanned at print time using a line-scan camera (e.g., Z-scores of 5.5 and 6.2 for data for lowercase 'a' and 's', corresponding to probabilities of false validation less than $2.3\times10^{-8}$ and $10^{-9}$, respectively) despite the considerable degradation of the inline device.

A method in accordance with an embodiment of the invention may include shape warp coding supported by the model-based approach. This method may provide degraded but still excellent levels of security in a compact and tractable fashion. Such intermediate levels of verification may useful because they support a tiered approach where the ability and/or need to fully forensically verify the validity of a forensic mark are reserved for a privileged user and/or device with access to a less public database.

In accordance with an embodiment of the invention, the print distortion may be separated from shape-conveying component of the profile which may permit higher levels of statistical discrimination between valid and false comparisons, thus supporting forensic levels of analysis. The model based approach in accordance with an embodiment of the invention can overcome global transformation between different imaging modalities (e.g. DrCID, line-scan camera, and high resolution mobile camera). The signature profiles can be processed and matched to overcome non-linear distortion. The implicit frame of reference that is provided by model matching may force the order of the signature profile to be fixed. This framing may simplify the matching process and allow shape warp codes to be extracted from the profile which offer simplified ease of use.

One or more embodiments of the invention may enable overcoming image deformation introduced by in-line scanning of a forensic mark, without the need to estimate the paper flow past the line-scan camera and perform/maintain alignment between the line-scan camera and the motion of the paper. Accordingly, these embodiments may not require additional hardware integrated into the line-scan camera and may result in reduced processing requirements at the time of capture, thus reducing associated expenses and software/time overhead.

Figure 8:
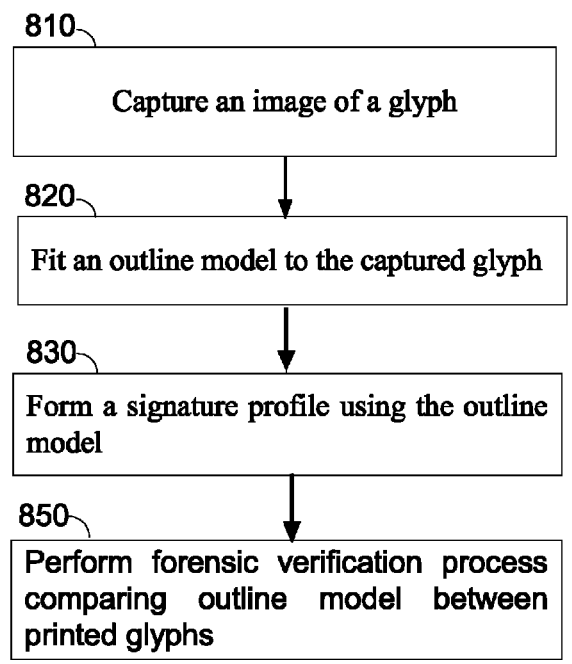
FIG. 8 depicts a process in accordance with an embodiment of the invention.

FIG. 8 illustrates process 800 in accordance with an embodiment of the invention. Process 800 may use a glyph model to extract a signature profile for forensic verification between printed glyphs. An image of a glyph may be captured, step 810. The image may be captured in one of several modalities, including a DrCID.

An outline model may be fitted, step 820, to the captured glyph. A signature profile may be formed or extracted based on the outline model, step 830. Extracting the signature profile includes separating the unique and/or random components of the glyph from the standard aspects of the outline model. Extracting the signature profile may also include application of a windowed edge function and/or application of a signal conditioning process including subtraction of a low-pass filtered Gaussian signal.

Forensic verification may be performed, step 850, by comparing the signature profiles of printed glyphs. For example, an S score (as described above) may be calculated for the two compared profiles so as to indicate a degree of similarity. A quality of the comparison may be approximated by calculation of a Z score.

For example, process 800 may be applied to compare a signature profile of a captured glyph to an authentic signature profile of an authentic glyph, in which the authentic glyph had been captured from a document that is known to be authentic.

Figure 9:
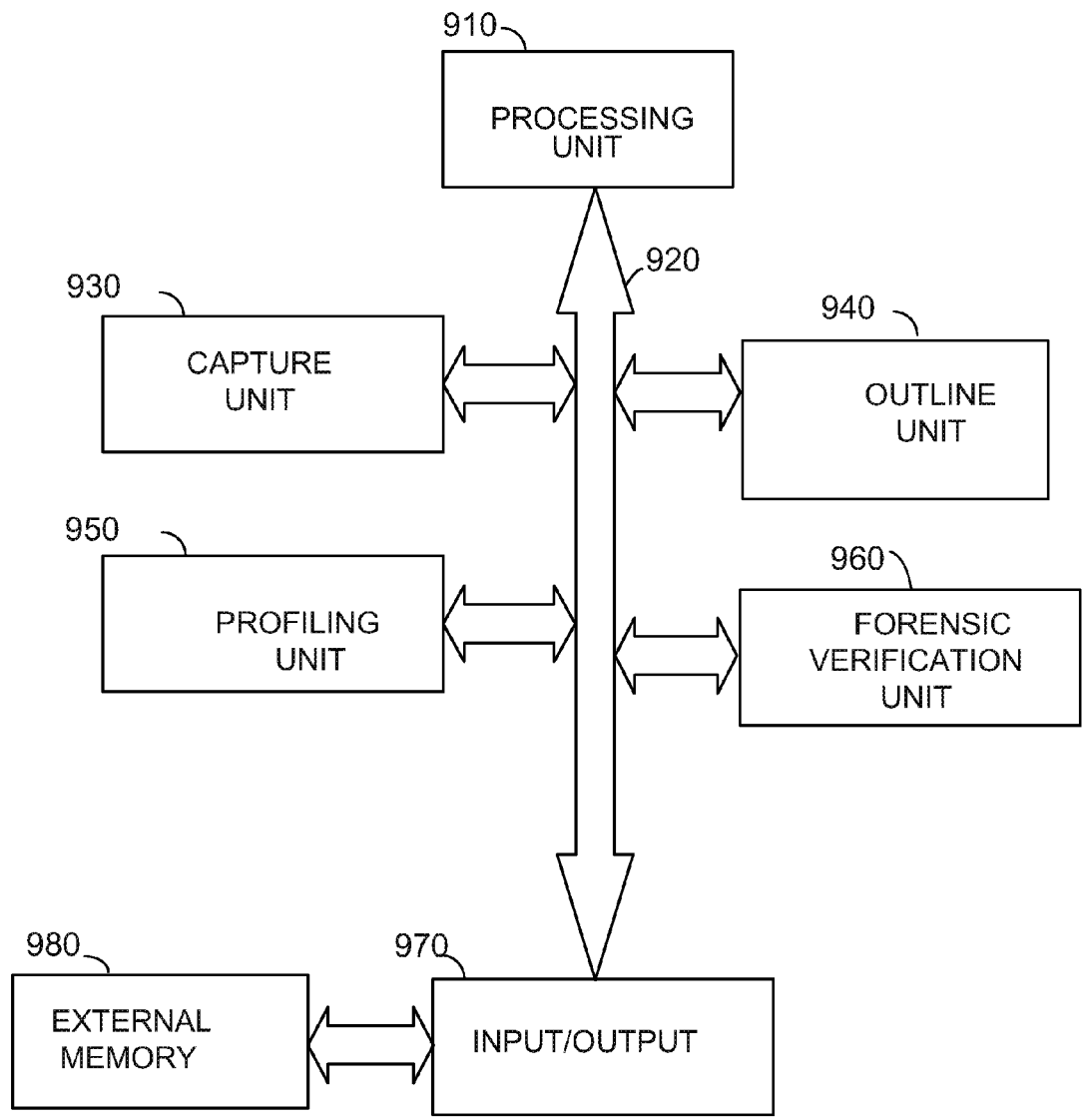
FIG. 9 depicts a schematic of a system in accordance with an embodiment of the invention.

FIG. 9 illustrates system 900 in accordance with an embodiment of the invention. System 900 may be implemented in a controller or processing unit 910. In accordance with an embodiment of the invention, processing unit 910 may be implemented in hardware (e.g., discrete analog circuitry, digital circuitry including field programmable gate arrays (FPGA), application specific integrated circuitry (ASIC), digital signal processor (DSP), and/or processing units), in software, or a combination of both hardware and software. System 900 may include bus 920 which interconnects the components of system 900. Capture unit 930 may capture a glyph image. Capture unit may include a DrCID, a line-scan imager, or other modality. Outline unit 940 may generate an outline model of the captured glyph(s). Profiling unit 950 may create a signature profile of the outline model. Forensic verification unit 960 may perform comparisons on the outline models of printed, captured glyphs to develop statistical data.

System 900 may include input/output unit 970, which may connect system 900 to external memory 980. External memory may include computer executable instructions that when executed by processing unit 910 cause system 900, and its components, to perform a method in accordance with an embodiment of the invention.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as a method for using a glyph model to extract a signature profile for forensic verification in accordance with an embodiment of the invention.

The computer-readable medium may be a non-transitory computer-readable media including all forms and types of memory and all computer-readable media except for a transitory, propagating signal. In one implementation, external memory 980 may be the non-volatile memory or computer-readable medium.

While there have been shown and described fundamental novel features of the invention as applied to one or more embodiments, it will be understood that various omissions, substitutions, and changes in the form, detail, and operation of these embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for model-based signature profile extraction, the method comprising:
    capturing an image of a glyph;
    fitting an outline model to the image of the glyph, wherein the outline model defines an outer edge of a model of the glyph; and
    extracting a signature profile of the glyph from regions of the image outside the outer edge defined by the fitted outline model.

2. The method of claim 1, further comprising:
    capturing an image of another glyph;
    fitting the outline model to the image of the other glyph; and
    extracting a signature profile of the other glyph based on the outline model;
    comparing the signature profile of the glyph to the signature profile of the other glyph so as to verify authenticity of the other glyph.

3. The method of claim 2, the wherein the comparing of the signature profile comprises applying dynamic time warping.

4. The method of claim 2, wherein the comparing of the signature profile comprises applying shape distortion encoding distance based on shape warp coding.

5. The method of claim 1, wherein extracting the signature profile comprises calculating a sum of windowed edge strengths.

6. The method of claim 1, wherein the outline model is one of a generic shape model, a generic glyph model, and a specific glyph instance model.

7. The method of claim 6, further including using a generic shape-matching algorithm to find the generic glyph model.

8. The method of claim 1, wherein extracting a signature profile comprises sampling a region normal to a contour of the outline model.

9. The method of claim 1, wherein extracting the profile includes removing low frequency variations.

10. The method of claim 1, wherein the glyph is a printed glyph.

11. A non-transitory computer readable medium having stored thereon instructions which when executed by a processor cause the processor to perform the method of:
    fitting an outline model to an image of a glyph, wherein the outline model defines an outer edge of a model of the glyph;
    forming a signature profile of the glyph from regions of the image outside the outer edge defined by the fitted outline model;
    comparing the formed signature profile to a signature profile of an authentic glyph to forensically verify authenticity of the formed signature profile.

12. The non-transitory computer readable medium of claim 11, further including instruction for calculating a sum of windowed edge strengths.

13. The non-transitory computer readable medium of claim 11, further including instruction for the outline model to be one of a generic shape model, a generic glyph model, and a specific glyph instance model.

14. The non-transitory computer readable medium of claim 11, wherein the instructions for forming the signature profile comprise instruction for sampling a region normal to a contour of the outline model.

15. The non-transitory computer readable medium of claim 11, wherein the instructions for forming the signature profile comprise instruction for removing low frequency variations.

16. The non-transitory computer readable medium of claim 11 wherein the instructions for comparing of the signature profile comprise instruction for applying dynamic time warping.

17. The non-transitory computer readable medium of claim 11, wherein the instructions for comparing of the signature profile comprise instruction for applying shape distortion encoding distance based on shape warp coding.

18. Apparatus, comprising:
    a controller in communication with a data bus;
    a capture unit configured to obtain a reference image of glyph;
    an outline unit configured to generate an outline model of the reference image, wherein the outline model defines an outer edge of a model of the glyph;
    a profiling unit configured to create respective signature profiles of the glyph from regions of captured images of the glyph outside the outer edge defined by versions of the outline model respectively fitted to the captured images; and a forensic verification unit configured to perform a comparison between the signature profiles created by the profiling unit from the captured images to forensically verify authenticity of the captured images;

wherein the capture unit, the outline unit, the profiling unit, and the forensic verification unit are in communication with each other and the controller via the data bus.

19. The apparatus of claim 18, further including an input/output unit connected to the data bus.

20. The apparatus of claim 18, wherein the capture unit is configured to control at least one of a Dyson relay CMOS inspection device and a line-scan imager.

* * * * *

UNITED STATES PATENT AND TRADEMARK OFFICE
CERTIFICATE OF CORRECTION

PATENT NO. : 8,842,916 B2  
APPLICATION NO. : 13/032479  
DATED : September 23, 2014  
INVENTOR(S) : Stephen Pollard et al.

Page 1 of 1

It is certified that error appears in the above-identified patent and that said Letters Patent is hereby corrected as shown below:

In the Claims

In column 10, line 4, in Claim 3, delete "the wherein" and insert -- wherein --, therefor.

In column 10, line 61, in Claim 18, delete "of" and insert -- of a --, therefor.

Signed and Sealed this
Tenth Day of February, 2015

Michelle K. Lee
*Deputy Director of the United States Patent and Trademark Office*